Patented Apr. 22, 1952

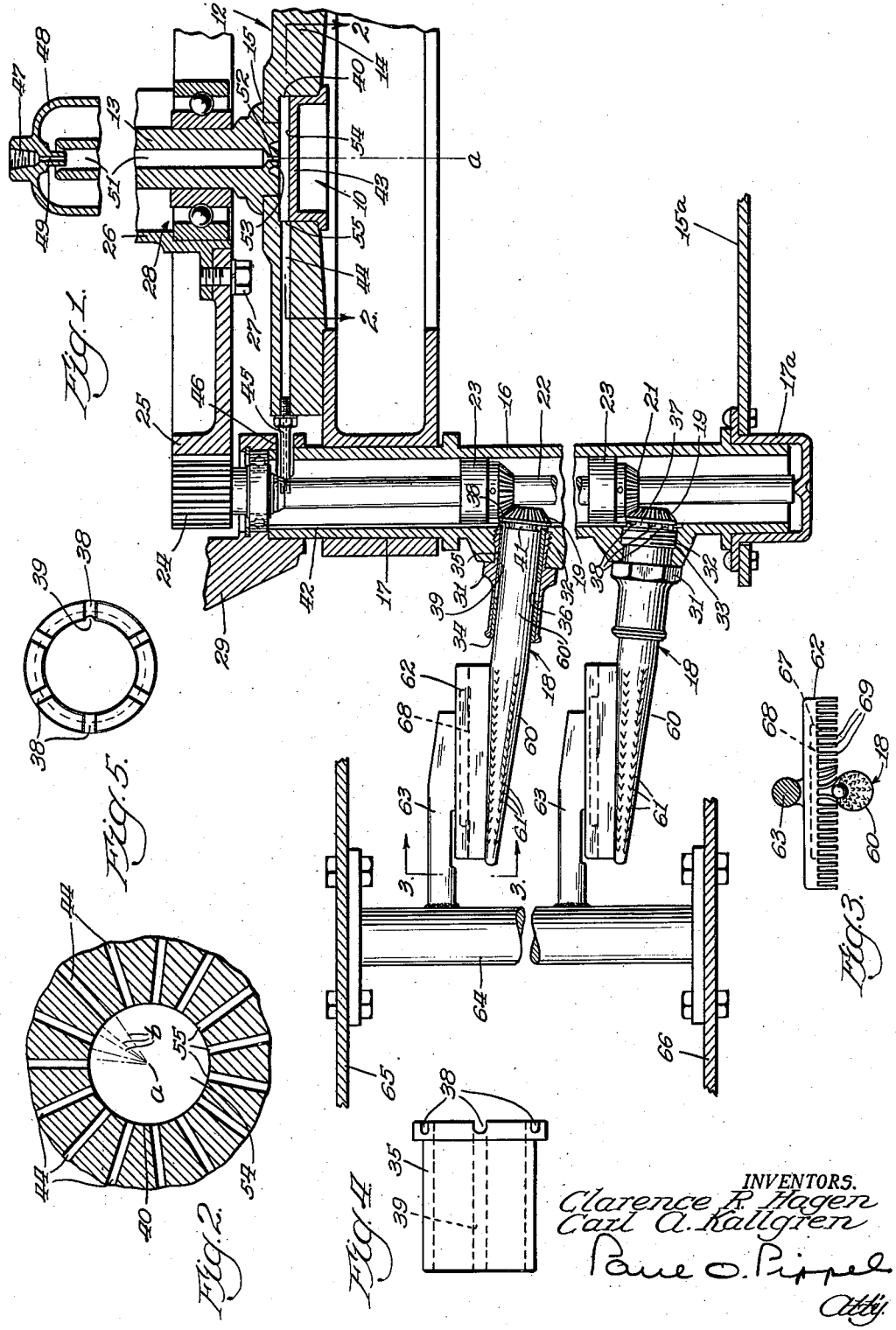

2,593,671

UNITED STATES PATENT OFFICE 2,593,671

COTTON PICKER SPINDLE LUBRICATING AND MOISTENING SYSTEM

Clarence R. Hagen and Carl A. Kallgren, Chicago, Ill., assignors to International Harvester Company, a corporation of New Jersey Application December 30, 1947, Serial No. 794,746

6 Claims. (Cl. 56—41)

This invention concerns apparatus for distributing liquid to a plurality of points in small predetermined quantities. The invention has particular utility in the distribution of lubricating liquid to the crop picking spindles of cotton picking apparatus of the general character disclosed in U. S. Patent No. 2,140,631 to E. A. Johnston, and the invention further contemplates a system for delivery of a portion of the distributed liquid onto crop engaging portions of the picker spindles to diminish the tendency of plant juices on such spindle surfaces causing an acretion of foreign particles. When a small quantity of the liquid is continuously deposited on the crop engaging portions of these spindles it serves to dilute and disperse such juices and thereby maintain the minute foreign particles of dust and small pieces of the plants etc. as discrete particles in contrast to their building up a crust-like coating that would diminish the crop picking aggressiveness of the spindles.

Cotton picking apparatus of the character disclosed in said Patent No. 2,140,631 includes a picking spindle carrier rotatable about a vertical axis and having several vertical bars spaced radially from such axis, and distributed circumferentially thereabout. These vertical bars are hollow and each contains a plurality of vertically spaced bearings, of which the axes are arranged horizontally and generally radially of the vertical carrier axis. The spindles have bearing portions disposed respectively in such bearings and crop engaging or picking portions projecting outwardly of such bearings radially of the carrier. Inner end portions of these spindles within their associated hollow bars have small beveled pinions mating with companion pinions which are constrained for rotation with drive shafts extending downwardly into the hollow bars. During operation of such cotton picking apparatus the picking unit comprising the carrier and the spindles journaled in the vertical bars thereof is transported beside and lengthwise of a row of cotton plants bearing mature cotton bolls. While being so transported, the vertical shafts in the spindle supporting bars are rotated, thereby causing rotation of the gears and of the spindles about their individual axes. Meanwhile, the carrier itself is rotated, causing the rotating spindles to revolve about the carrier axis, and this rotation of the carrier is in the direction causing the revolving spindles to sweep forwardly while on the side of the carrier most remote from the plant row and to sweep rearwardly while disposed within the plant row at the opposite side of the carrier, the speed of rotation of the carrier being correlated with the speed of its advancement lengthwise of the plant row so such rearward movement of the spindles relative to the carrier axis is at the same speed that the carrier is advanced along the plant row, whereby the spindles remain stationary lengthwise of the plant row while projecting into the foliage. While the crop engaging portions of the spindles are inserted into the plant foliage and while being rotated about their individual axes, these plant engaging portions of the spindles contact the pods of cotton and cause part of the cotton to be wrapped about the spindles so that when the spindles are withdrawn from the plants the crop will be extracted from the balls. The revolving spindles after being withdrawn from the plant row have the cotton doffed therefrom by doffing apparatus which may be of the character disclosed in detail in said patent. From the station at which the doffing occurs, the revolving spindles next pass to a moistening station at which moistening pads are engaged by the spindles sweeping therepast. The apparatus disclosed in said patent employs water delivered by these pads onto the spindles for diluting the juices deposited thereon by crushed plant stems and thereby diminishes the stickiness and tendency of the juices to cause an acretion of foreign dust particles and the like into a solidified crust which would diminish the picking efficiency of the spindles. After passing the moistening station, the revolving spindles commence a repetition of the cycle by again sweeping into position for insertion into the plant row.

In a typical commercial cotton picking unit there are fifteen of the vertical hollow picker spindle supporting bars and there are twenty vertically spaced spindles on each of these bars, making a total of three hundred spindles on each carrier. There is, of course, a bearing for each spindle. Each of these bearings requires a continuous supply of liquid lubricant, although the quantity of lubricant is small. It has remained a problem to supply the spindle bearings with a uniform amount of liquid lubricant in the desired minute quantity. An excess of the required amount of lubricant is undesirable because of needless waste and also because appreciable amounts of hydro-carbon oil which is normally used for the lubricant coming in contact with the picked cotton fibers has a tendency to discolor the fibers and lower the market value of the crop.

One of the objects of this invention is the provision of a lubricating liquid distributing system employing an improved device for distributing small quantities of the liquid in equal or other predetermined relative amounts and not materially effected in its accuracy by tilting, tossing, or vibrations to which the picker may be subjected while in use in the field.

A more specific object is the provision of an oil distributing device embodying a rotatable structure having an upwardly facing liquid distributing surface wherein there are like-shaped surface elements radiating from a central point at which the axis of rotation intersects such surface, and a plurality of outlet means spaced apart about the perimeter of such surface for receiving and conducting away liquid which has been distributed radially from the central point, such outlet means being disposed at a sufficiently low elevation with respect to said surface that the liquid thereon can not build up to an appreciable depth. It has been found that a perfectly smooth flat horizontal surface suffices very well in such a device.

A further object is the provision of a liquid distributing device of the above character wherein there is a body rotatable about a vertical axis and having a vertical bore coaxial with such axis, the side walls of the bore containing ports of said outlet means, and a plug inserted into the bottom of said bore and having an upper surface providing such liquid distributing surface.

A further object is the provision of a liquid distributing system in cotton picking apparatus of the above character, wherein liquid delivered through a liquid distributing device to the picker spindle bearings is further conducted onto the crop engaging portions of the picker spindles for moistening these portions of the spindles and thereby performing the function of the above mentioned water moistening apparatus.

A still further object is the provision of liquid distributing and spindle moistening apparatus according to the last preceding object, wherein there are spindle scrubbing pads disposed adjacently to the spindle carrier for being brushed against by the spindles sweeping therepast to enable these pads to loosen and dislodge small foreign particles from the spindles as an expedient for preventing the accumulation of such particles into a hard crust.

The above and other desirable objects inherent in and encompassed by the invention will be fully comprehended from the ensuing specification and drawings, wherein:

Fig. 1 is a fragmentary view taken in section on a vertical plane through a spindle bar carrier of a cotton picker unit and liquid distributing device constructed according to this invention, only one of the vertical spindle supporting bars being fragmentarily shown in section with only the upper spindle and the lower spindle journaled in such bar, together with scrubbing pads and the support therefor associated with such spindles.

Fig. 2 is a horizontal fragmentary sectional view, taken on the line 2—2 of Fig. 1, illustrating the distributing surface of the liquid distributing device and channels leading therefrom.

Fig. 3 is a vertical sectional view taken on the line 3—3 of Fig. 1, showing one of the picker spindles in end elevation and one of the scrubbing pads in cooperating elevation with such spindle.

Figure 4 is a side elevational view of a flanged bearing sleeve used for journalling the shank of the picker spindle.

Figure 5 is an end view of the bearing sleeve of Figure 4, illustrating radial lubricant conducting grooves in an end face of the flange and an axial groove within the inner periphery of said sleeve.

The distributing device for proportioning quantities of liquid to lubricate the spindle bearings and moisten crop-engaging spindle surfaces is generally designated 10 and is mounted coaxially with a rotatable carrier structure 12 of the cotton picking unit. This cotton picking unit is of the general character of that disclosed in the aforesaid Patent No. 2,140,631. Carrier 12 rotates about a vertical axis "a" and is driven by a drive shaft 13 welded to an upper end plate 14 of the carrier at 15. This plate 14 cooperates with a bottom plate 15ª for supporting a plurality of hollow spindle-carrying bars 16 which are arranged vertically and are spaced circumferentially about the carrier. The upper plate 14 is provided with a plurality of bearings 17 respectively for upper end portions of the circumferentially spaced spindle-carrying bars 16, and the lower plate 15ª is provided with similarly spaced bearings 17ª for lower end sections of said bars.

Each carrier bar 16 supports a plurality of vertically spaced picker spindles 18 having beveled gears 19 upon ends thereof projecting into the interior of their bars. Gears 19 are driven by companion gears 21 constrained for rotation with an associated shaft 22, there being a shaft 22 in each of the carrier bars 16. The shafts 22 are piloted in ball bearing units 23 spaced axially thereof and carried within and by the carrier bars. All of the shafts 22 are driven in the same direction by gears 24 upon their upper ends which mutually mesh with a large sun gear 25 which is rotated by a large tubular drive shaft 26 secured thereto by cap screws 27. Concentricity is maintained between the sun gear 25 and the carrier 12 by a ball bearing unit 28. The bars 16, which are oscillatable within their bearings 17 and 17ª, are controllable in the angularity of their oscillation by arms 29 respectively secured to their upper ends. These arms 29 are oscillated by cam means (not shown) for causing the spindles 18 on their associated bars 16 to enter the crop plants perpendicularly to the plant row during that cycle in the rotation of the carrier 12 when the spindles are presented to the plants and to remain perpendicularly to the row while projected into the plants and while being subsequently withdrawn therefrom.

Each of the spindles 18 is journaled in a bearing nut 31 having an externally threaded end portion 32 turned into a threaded side wall opening 33 in the associated carrier bar 16. Axially spaced bearing sleeves 34 and 35 are disposed in each bearing nut 31, the space 36 between the opposed ends of these bearing sleeves providing a small reservoir for lubricating liquid. The inner peripheries of these sleeves constitute a bearing bore for the cylindrical spindle portions 60' which merge with tapered picking portions 60 of such spindles. The inner end of the bearing sleeve 35 has a flange 37 abutting against the inner end of its bearing nut and this flange has a plurality of notches 38 within its inner end face and communicating between the radially outer face thereof and the inner periphery of the bearing sleeve. One of these notches 38 communicates with an internal axially extending channel 39 leading to the reservoir 36, this particular notch 38 of the bearing sleeve being preferably disposed upwardly as illustrated in Fig. 1. Each of the notches 38 communicates with a groove 41 in the spindle adjacently to the gear 19 formed integrally therewith whereby lubricating liquid introduced to the upper end of the spindle bar and flowing downwardly thereof within an internal channel 42 can flow successively through the notches 38 and grooves 41 of the vertically spaced spindles, such liquid entering the uppermost notch or notches 38 of the uppermost bearing sleeve 35, flowing downwardly in the groove 41 of the associated spindle, thence outwardly through the lowermost notch or notches 38 into that portion of the groove 42 beneath the uppermost spindle, and so on through each of the spindle structures. Part of the oil will migrate onto the companion bevel gears associated with each spindle and part will migrate through the bearing sleeve passage 39 into the reservoir 36 of each spindle.

The liquid distributing device for causing equal quantities of the liquid to be introduced at a slow rate into the upper ends of the spindle supporting bars 16 comprises a bore 40 in the carrier upper plate 14 which constitutes a body of such device. This structure is formed and rotatable coaxially of the axis "a." A member 43 in the form of a plug is inserted upwardly into the lower end of the bore 40 to form an oil receiving cavity within such bore. A plurality of channels 44 radiate from the cavity as illustrated in Fig. 2. There are the same number of channels 44 as there are spindle supporting bars 16 for respectively conducting spindle lubricating and moistening liquid to these bars. The channel 44 shown in Fig. 1 is illustrated as having a tube 45 projecting from its outer end through a side wall opening 46 in the associated bar 16 for delivering the lubricating liquid thereinto. A similar tube is provided in the outer end of each of the channels 44.

Lubricating liquid is introduced into the device 10 by a metering device such as a regulatable drip tube (not shown) receivable by a threaded recess 47 in a non-rotatable casing portion 48 shown in the upper part of Fig. 1. From the recess 47 the metered liquid is fed through a bottom bore 49 into the upper end of a bore 51 in the hollow shaft 13. A delivery bore 52 of small diameter in a nozzle tip 53 formed at the lower end of the shaft 13 is adapted to direct the meter liquid onto a liquid distributing surface 54 formed by the upper face of the plug 43 or the bottom of the recess within the bore 40. Bore 52 is coaxial with the axis "a" and causes the liquid to be delivered at a point on the surface 54 which is intersected by said axis. From this point the liquid spreads radially upon the surface 54. This tendency for the liquid to spread radially is augmented by centrifugal force created by the rotating carrier 12 with which the surface 54 rotates about the axis "a."

The liquid distributing surface 54 may be considered as constituting like-shaped surface elements "b," Fig. 2, radiating from the central point at which said surface is intersected by the axis "a." In this incidence the surface elements "b" are straight lines and all lie within the same horizontal plane. By making the surface 54 smooth and flat the liquid is caused to spread as a thin layer or film at a uniform rate in every direction from the central point. Therefore equal quantities of such liquid are cause to be delivered to the inner ends or ports 55 of the channels 44. In a cotton picking unit of the kind being presently commercially produced, employing fifteen spindle carrier bars and twenty spindles to the bar, liquid is fed onto the central point of the oil distributing surface 54 at a rate of ninety drops per minute. In other words, the means for directing the liquid onto said surface essentially at said point does so at a rate causing drainage of the liquid radially from said point in film-like formation. When the liquid is fed at this rate onto the surface 54 such liquid can spread radially sufficiently rapidly that it forms a very thin layer on said surface, the layer being so thin that the adhesive attraction to the surface is adequate to preponderantly prevail over gravitational and inertia forces experienced because of the cotton picker machine in which the unit is installed being operated over a field surface which is not level or because of the unit being tossed about when the machine traverses field depressions and hummocks. Maintenance of the layer of liquid on the surface 54 sufficiently thin that the adhesive attraction to such surface causes such liquid to flow at a uniform rate in all radial directions is insured by placing such surface at substantially a flush or equal elevation position with respect to the lower sides of the channels 44, or, at least in placing the surface 54 at a substantially lower elevation than the upper sides of said channels.

During operation of the apparatus the large tubular shaft 26 is rotated and so is the tubular shaft 13. Both of these shafts are rotated in the same direction, but with the shaft 26 being rotated faster. In this manner the large gear 25 is rotated more rapidly than the carrier 12 so that the gear 25 causes rotation of the gears 24, the shafts 22, the gears 21 and 19, and the spindles 18. The spindles 18 are continuously rotated about their individual axes while being revolved about the carrier axis "a." Rotation of the carrier about the axis "a" causes the spindle lubricating and moistening liquid introduced into the passages 44 to be discharged outwardly through the tubes 45 into their respectively associated spindle carrying bars 16. The centrifugal force further causes the liquid discharged from the outer ends of the tubes 45 to be thrown onto the outward sides of the inner peripheries of the tubular bars 16 for accumulating in the vertical bores 42 and streaming downwardly therein into the bearings of the spindles 18. Some of the oil guided by the vertical grooves 42 streams over the outer surface of the bearing sleeve flanges 37 and onto the gears 19 to lubricate the gears 19 and 21. Part of the lubricating liquid entering the bearing reservoirs 36 through the bearing sleeve grooves 39 migrates axially outwardly between the bearing sleeves 34 and portions of the spindles journaled therein. Thus there is liquid conducting means including the journal portions of the spindles and the bearings receiving the same constructed with sufficient clearance space therebetween that the liquid migrates through such space onto the crop engaging surfaces of the spindles. This clearance space can be regarded as a seepage passage means. Flow of oil through the sleeve 34 is expedited by rotation of the spindles therein and by centrifugal force upon the oil within the reservoirs 36 caused by the revolving of the spindles about the carrier axis "a." That portion of the lubricating liquid passing axially outwardly of the bearing sleeves 34 coats the crop engaging portions 60 of the spindles and thereby dilutes the plant juices thereon and diminishes the tendency thereof to cause an accretion of dirt particles. A thin crust of dirt particles upon the crop engaging portions 60 would interfere with the crop snagging function of barbs 61 and thereby diminish the picking utility of the spindles.

The effectiveness of the lubricating liquid film upon the picking portion 60 of the spindles to prevent accumulation of trash particles is augmented by scrubbing pads 62 which are supported one above the other by means of arms 63 projecting outwardly from a supporting column 64 which is secured at its ends to upper and lower casing walls 65 and 66 of the cotton picking unit. In Fig. 3 it can be seen that these pads 62 comprise upper pocketed bodies 67 which receive a flat head 68 of their associated stems 63. These pads are preferably made of pliable rubber and have integrally formed downwardly projecting fins 69 disposed in parallelism to one another and also substantially parallel with the axes of the spindles 18 while the latter are in registry with such pads. These pads fins 69 are flipped by spindles sweeping successively therepast and in this manner are caused to engage and to dislodge dirt particles from the spindles.

By so constructing the spindle bearing structures that they facilitate delivery of lubricant onto the spindle picking surfaces, and by using these bearing structures in combination with means for distributing minute predetermined quantities of lubricating liquid thereto, the amount of such liquid reaching the crop-engaging portions of the spindles is regulated and caused to reach such crop engaging spindle portions at a uniform rate. Therefore, such of the liquid that is contacted by the picked crop and thereby picked up thereby is distributed throughout the great mass of the harvested crop. Amounts of the liquid in concentrated quantities having a deleterious effect upon the crop does not therefore occur. A liquid having suitable properties as a lubricant for the spindles and also sufficiently fluidal to distribute properly upon the crop engaging portions of the spindles is petroleum lubricating oil having a viscosity of approximately 65 at a temperature of 100° F. Oil having these properties is produced by the Texaco Corporation under the trade name of "Texspray."

The advantage of paramount importance in employing the herein disclosed system of depositing lubricating liquid upon the crop engaging portions of the spindles is the elimination of auxiliary apparatus for moistening the spindles by means of water. A commercially employed water moistening system is illustrated in co-pending application Serial No. 476,705 for "Spindle Moistening Apparatus" filed February 22, 1943, by David B. Baker & Clarence R. Hagen, now Patent No. 2,433,083. In addition to eliminating the cost of the water moistening system, the present invention eliminates the need for stopping operation of the machine periodically for refilling the water supply tank of such apparatus. The importance of this factor will be understood when it is realized that a cotton picking machine operates at the picking rate of forty manual pickers, wherefore a ten minute stop for refilling a water tank would amount to 6⅔ man hours.

A further advantage of employing the lubricant liquid for moistening the spindles is that such liquid decreases the affinity of the spindles for the cotton thereon in comparison to the affinity of water moistened spindles, making doffing of the cotton from the spindles less difficult. This in turn makes it practicable to employ a spindle having a longer barb-bearing or crop-engaging portion and still obtain satisfactory doffing. Increasing the length of the crop engaging portions of the spindles makes it possible to use a wider crop receiving throat in a cotton picking unit because the longer spindle portions can reach to the opposite side of a thicket mass of compressed plants, and with the wider throat the plants will be compressed to a lesser degree and thereby facilitate the withdrawal between the mass of stems thereof all the crop wound upon the spindles. This of course increases the percentage of cotton which the machine is capable of picking.

Having thus described a preferred embodiment of the invention with the view of clearly and concisely illustrating the same, we claim:

1. Cotton picking apparatus comprising a cotton picker spindle carrier rotatable about a vertical axis, spindle bearings on said carrier for revolving about said axis when the carrier rotates, said bearings being spaced radially outward from said axis and their axes being arranged generally radially of such axis, picker spindles having respective journal portions journaled in said bearings and picking portions with crop-engaging surfaces projecting outwardly of said bearings radially of the carrier, a distributing structure for a lubricant for said bearings and for moistening the crop picking portions of said spindles, said structure being rotatable coaxially with the carrier and comprising a member with an upwardly facing liquid distributing surface intersected by the carrier axis at a point from which like-shaped elements of said surface symmetrically radiate to cause radial distribution thereon of liquid deposited at said point, means for depositing liquid at said point of the liquid distributing surface, a plurality of liquid outlet means spaced apart about the perimeter of said surface for receiving and conducting away the radially distributed liquid, conduit means rotatable with the carrier and communicating between said outlet means and respectively associated of said bearings for conducting the distributed liquid thereto, and liquid conducting means including the journal portions of the spindles and bearings receiving the same constructed with sufficient clearance space therebetween that the lubricating liquid migrates through such space onto the crop engaging surfaces of the spindles pursuant to rotation of the carrier and rotation of the spindles in their bearings to accommodate a constant delivery of the liquid onto such spindle surfaces for diluting plant juices and thereby diminish the tendency of such juices to cause an acretion of foreign particles upon such spindle surfaces.

2. The combination set forth in claim 1 wherein there are spindle scrubbing pads stationed adjacently to a side of the carrier and disposed for being brushed against by said spindle surfaces moving therepast when the carrier rotates to dislodge the foreign particles from said spindle surfaces.

3. Cotton picking apparatus comprising a cotton picker spindle carrier rotatable about a vertical axis, spindle bearings on said carrier for revolving about said axis when the carrier rotates, said bearings being spaced radially outwardly from said axis and their axes being arranged generally radially of such axis, picker spindles having respective journal portions journaled in said bearings and picking portions with crop-engaging surfaces projecting outwardly of said bearings radially of the carrier, a distributing structure for liquid constituting a lubricant for said bearings and for moistening the crop picking portions of said spindles, said structure having a plurality of liquid outlet means, conduit means rotatable with the carrier and communicating between said outlet means and respectively associated of said bearings for conducting the distributed liquid thereto, and liquid conducting means including the journal portions of the spindles and bearings receiving the same constructed with sufficient clearance space therebetween that the lubricating liquid migrates through such space outwardly onto the crop engaging surfaces of the spindles pursuant to rotation of the carrier and rotation of the spindles in their bearings to accommodate a constant delivery of the liquid onto such spindle surfaces for diluting plant juices and thereby diminish the tendency of such juices to cause an acretion of foreign particles upon such spindle surfaces.

4. The combination set forth in claim 3, wherein there are spindle scrubbing pads stationed adjacently to a side of the carrier and disposed for being brushed against by said spindle surfaces moving therepast when the carrier rotates to dislodge the foreign particles from said spindle surfaces.

5. In combination with a bearing having a cylindrical bore and means for introducing a fluid lubricant into said bore adjacent one end thereof, of a cotton picker spindle having a substantially cylindrical portion merging with a tapered and barbed picking portion, at least a part of said cylindrical portion being received in said bearing and the tapered portion projecting from the opposite end of said bearing, whereby the lubricant will seep along said spindle and outwardly along said tapered portion.

6. In combination with a bearing having a cylindrical bore and means for introducing fluid lubricant into said bore remote from an end thereof, of a cotton picker spindle having a substantially cylindrical portion merging with a cotton picking portion, at least a part of said cylindrical portion being received in said bearing and the picking portion projecting from said end of the bearing, whereby the lubricant will travel along said spindle and outwardly along the picking portion thereof.

CLARENCE R. HAGEN.
CARL A. KALLGREN.

REFERENCES CITED

The following references are of record in the file of this patent:

UNITED STATES PATENTS

| Number | Name | Date |
|---|---|---|
| 670,998 | Patterson | Apr. 2, 1901 |
| 1,736,799 | Planert | Nov. 26, 1929 |
| 2,024,690 | Harris | Dec. 17, 1935 |
| 2,140,631 | Johnston | Dec. 20, 1938 |
| 2,433,083 | Baker et al. | Dec. 23, 1947 |
| 2,450,599 | Kloda | Oct. 5, 1948 |
| 2,467,722 | Baker | Apr. 19, 1949 |